US006993293B1

(12) United States Patent  (10) Patent No.: US 6,993,293 B1
Bevan et al.  (45) Date of Patent: Jan. 31, 2006

(54) METHOD OF PREDICTING WIRELESS SIGNAL POWER

(75) Inventors: Damian Bevan, Bishop's Stortford (GB); Victor T Ermolayev, Nizhny Novgorod (RU); Alexander G Flaksman, Nizhny Novgorod (RU); Ilya M Averin, Nizhny Novgorod (RU)

(73) Assignee: Nortel Networks Limited, St. Laurent (CA)

( * ) Notice: Subject to any disclaimer, the term of this patent is extended or adjusted under 35 U.S.C. 154(b) by 473 days.

(21) Appl. No.: 10/236,438

(22) Filed: Sep. 6, 2002

(51) Int. Cl.
*H04B 17/00* (2006.01)
(52) U.S. Cl. .................. 455/67.11; 455/423; 370/241; 375/224
(58) Field of Classification Search ............. 455/67.11, 455/423, 424; 370/241, 250, 251, 252; 375/224
See application file for complete search history.

(56) References Cited

U.S. PATENT DOCUMENTS

2003/0026363 A1 * 2/2003 Stoter et al. ................. 375/345

OTHER PUBLICATIONS

Tanskanen et al. Predictive Power Estimators in CDMA Closed Loop Power Control, Apr. 1998. Vo. 7803-4320, pp. 1091-1095.*

Duel-Halen, "Long-Range Prediction of Fading Signals", IEEE Signal Processing Magazine, May, 2000, pp 62-75.

* cited by examiner

*Primary Examiner*—Lee Nguyen
(74) *Attorney, Agent, or Firm*—Barnes & Thornburg LLP

(57) ABSTRACT

The invention provides a method of predicting the power of a received wireless signal (e.g. as received by a mobile device), the method having the steps of: sampling the power of the received wireless signal over an observation interval to obtain a series of values representative of the power of the received wireless signal over the observation interval; and extrapolating the series of values beyond the observation interval to predict the future power of the received wireless signal. In a preferred embodiment of the invention, the method has the steps of: sampling the power of the received wireless signal over an observation interval to obtain a first series of values representative of the power of the received wireless signal over the observation interval; performing an additive white gaussian noise smoothing operation on the first series of values to give a series of smoothed samples over the observation interval, and removing the bias due to the influence of the additive white gaussian noise; performing least mean squares curve fitting on the smoothed samples; fitting a second order polynomial curve to the smoothed samples; and extrapolating the fitted curve beyond the observation interval to predict the future power of the received wireless signal. Also provided are a wireless device (e.g. a mobile phone) having signal processing apparatus operable to perform such a method, and a wireless communications network including a plurality of such wireless devices.

17 Claims, 10 Drawing Sheets

METHOD OF PREDICTING WIRELESS SIGNAL POWER

This invention relates to a method of predicting the power of a received wireless signal. It is particularly suited, but by no means limited, to predicting the power of a wireless signal received by a mobile device.

BACKGROUND OF THE INVENTION

Upcoming third generation wireless systems are intended to have the ability to transmit high speed data, video and multimedia traffic, as well as voice signals to mobile users. Careful choices of modulation, coding, power control and detection methods need to be made in order to make good use of the available channels.

The power of a wireless signal received by a terminal device (e.g. mobile phone) is susceptible to constructive and destructive interference occurring as the device moves relative to signal scattering objects such as buildings. Fluctuations in the signal strength occur due to Doppler effects as the mobile device moves. Devices which themselves are not moving may still be susceptible to constructive and destructive interference occurring as other objects in the environment around them move their relative positions.

The power of the received wireless signal is given by the squared modulus of the complex phasor corresponding to the amplitude and phase of the received signal. Adaptive modulation may be used to provide a modulation technique appropriate to the instantaneous power level of the received signal. If the received signal is strong (i.e. is of high power), then Quadrature Amplitude Modulation (QAM) can be used, which maximises the data transmission rate. Alternatively, if the received signal is weak (i.e. is of lower power), then Quadrature Phase Shift Keying (QPSK) is more appropriate.

The mobile device is able to measure the power of the received signal at any given time. However, there is an inherent delay (e.g. 2 to 10 ms) in transmitting this information from the mobile device back to the transmitter and then processing the information. There is insufficient time to enable the transmitter to receive and process this information before making the decision as to which modulation technique to employ. This is because the power of the received signal fluctuates because of the Doppler effects, and so, within an increment of time, any measured signal strength will no longer be current. Thus, in order to be able to select the most appropriate modulation technique, it is necessary to be able to predict what the received signal power will be at an increment of time in the future.

Some prior approaches to the problem of Modulation and Coding Scheme Prediction (MCSP) are reviewed by A. Duel-Hallen, S. Hu and H. Hallen in "Long-Range Prediction of Fading Signals—Enabling Adapting Transmission for Mobile Radio Channels" (IEEE Signal Processing Magazine, May 2000).

These prior approaches are based on the concept of predicting future values of the complex channel, rather than future values of the real channel power (i.e. magnitude squared of the complex channel value). These alternative techniques use, as their input, noisy measured historical complex channel values, rather than measured real channel power values. Such techniques described by Duel-Hallen et al., and elsewhere, include Linear Prediction techniques (e.g. the Wiener filter) and Non-Linear techniques. Typical examples of Non-Linear Prediction techniques are the Fourier Predictor and Capon's Predictor. The Non-Linear complex channel prediction techniques attempt to model the channel as a set of discrete sources with given Doppler frequency, phase and complex amplitude, and use this information to predict future complex channel values. Whilst such Linear and Non-Linear techniques may in some cases offer acceptable performance, they have the following disadvantages:

- They require the use of known training symbols, which leads to a transmission overhead
- They require a long observation interval in order to extract enough information to accurately characterise the complex fading process
- They tend to be computationally complex
- Their complexity increases significantly for Multiple-Input-Multiple-Output (MIMO) and dispersive channels, since each path must be tracked separately.

SUMMARY OF THE INVENTION

According to a first aspect of the invention there is provided a method of predicting the power of a received wireless signal, the method comprising the steps of: sampling the power of the received wireless signal over an observation interval to obtain a series of values representative of the power of the received wireless signal over the observation interval; and extrapolating the series of values beyond the observation interval to predict the future power of the received wireless signal.

According to a second aspect of the invention there is provided a method of predicting the power of a received wireless signal, the method comprising the steps of: sampling the power of the received wireless signal over an observation interval to obtain a first series of values representative of the power of the received wireless signal over the observation interval; performing a smoothing operation on the first series of values to give a series of smoothed samples over the observation interval, wherein the number of smoothed samples is less than the number of values in the first series of values; and extrapolating the smoothed samples beyond the observation interval to predict the future power of the received wireless signal.

Preferably the step of extrapolating comprises: performing least mean squares curve fitting on the smoothed samples; and then extrapolation of the fitted curve beyond the observation interval.

Particularly preferably the step of performing least mean squares curve fitting comprises fitting a polynomial curve to the smoothed samples. In a preferred embodiment of the invention the polynomial curve is a second order polynomial.

Preferably the step of performing the smoothing operation comprises performing an additive white gaussian noise smoothing procedure. Particularly preferably this step is followed by a further step of removing the bias due to the influence of the additive white gaussian noise.

Preferably the method further comprises the step of excluding any predictions of negative power.

The method may be performed by signal processing apparatus in the mobile device, or by signal processing apparatus at a base station.

According to a third aspect of the invention there is provided a method of predicting the power of a received wireless signal, the method comprising the steps of: sampling the power of the received wireless signal over an observation interval to obtain a first series of values representative of the power of the received wireless signal over the observation interval; performing an additive white gaussian noise smoothing operation on the first series of values to give a series of smoothed samples over the observation interval, and removing the bias due to the influence of the additive white gaussian noise; performing least mean squares curve fitting on the smoothed samples; fitting a second order polynomial curve to the smoothed samples; and extrapolating the fitted curve beyond the observation interval to predict the future power of the received wireless signal.

According to a fourth aspect of the invention there is provided a wireless device having signal processing apparatus, the signal processing apparatus being operable to predict the power of a wireless signal received by the wireless device, the signal processing apparatus being arranged to: sample the power of the received wireless signal over an observation interval to obtain a first series of values representative of the power of the received wireless signal over the observation interval; perform a smoothing operation on the first series of values to give a series of smoothed samples over the observation interval; and extrapolate the smoothed samples beyond the observation interval to predict the future power of the received wireless signal.

According to a fifth aspect of the invention there is provided a wireless device having signal processing apparatus, the signal processing apparatus being operable to predict the power of a wireless signal received by the wireless device, the signal processing apparatus being arranged to: sample the power of the received wireless signal over an observation interval to obtain a first series of values representative of the power of the received wireless signal over the observation interval; perform an additive white gaussian noise smoothing operation on the first series of values to give a series of smoothed samples over the observation interval, and remove the bias due to the influence of the additive white gaussian noise; perform least mean squares curve fitting on the smoothed samples; fit a second order polynomial curve to the smoothed samples; and extrapolate the fitted curve beyond the observation interval to predict the future power of the received wireless signal.

According to a sixth aspect of the invention there is provided a wireless communications network including a plurality of wireless devices, each wireless device having signal processing apparatus, the signal processing apparatus being operable to predict the power of a wireless signal received by the wireless device, the signal processing apparatus being arranged to: sample the power of the received wireless signal over an observation interval to obtain a first series of values representative of the power of the received wireless signal over the observation interval; perform a smoothing operation on the first series of values to give a series of smoothed samples over the observation interval; and extrapolate the smoothed samples beyond the observation interval to predict the future power of the received wireless signal.

According to a seventh aspect of the invention there is provided signal processing apparatus arranged to perform a method of predicting the power of a received wireless signal, the method comprising the steps of: sampling the power of the received wireless signal over an observation interval to obtain a first series of values representative of the power of the received wireless signal over the observation interval; performing a smoothing operation on the first series of values to give a series of smoothed samples over the observation interval; and extrapolating the smoothed samples beyond the observation interval to predict the future power of the received wireless signal.

According to further aspects of the invention there is provided a computer program executable to cause signal processing apparatus to perform a method of predicting the power of a received wireless signal, a computer program stored on a data carrier, and a computer program executing on signal processing apparatus.

It is important to note that the features which relate to the second aspect of the invention, which are described above as being preferable, may also be applied to the other aspects of the invention, either singularly or in combination.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described, by way of example, and with reference to the drawings in which.

DETAILED DESCRIPTION OF PREFERRED EMBODIMENTS

A preferred embodiment of the invention is referred to herein as the Polynomial Power Predictor (PPP) method. The PPP method may be performed on signal processing apparatus, which may be in the mobile device or at the transmitting base station. The signal processing apparatus may be, for example, a digital signal processor (DSP), an application-specific integrated circuit (ASIC), a standard non-specialist signal processor, or a circuit made of discrete electronic components. Other suitable signal processing apparatus may be known to those skilled in the art.

The purpose of the PPP method is to predict what the power of a received wireless signal will be at some point in the future, after a period of time termed the 'Prediction Interval' (PI). This prediction of signal power is based on knowledge of a set of recent noisy measured samples of signal power, collected over what is termed the 'Observation Interval' (OI). The actual value of the signal power at points in the future is not known a-priori, since it is a function of the random amplitude fluctuations of the wireless channel. These fluctuations are known as 'Small-Scale Fading' (SSF)— often modelled using a Rayleigh distribution. The rate of fluctuation is a function of the Doppler spread of the channel, itself a function of the User Equipment (UE) speed.

1. Overview of Method

The first step in the method is the 'AWGN smoothing procedure', as discussed in detail below. (In fact this is a smoothing of errors due to noise (AWGN), and interference, and randomness in the transmitted data values, if the transmitted signals are non-constant-modulus.) A large number of noisy measured channel power samples are averaged (over the 'Averaging Interval', AI) to give a single 'smoothed sample'. The number of samples, K, which can be used in the smoothing is proportional to the ratio of the signal bandwidth (e.g. 5 MHz) to the channel Doppler spread (e.g. 50 Hz). Typical values for K are 500, or 5000. The smoothed channel samples will have a lower noise variance than the raw measurements (by the factor K). On the other hand, the smoothed samples will contain a 'dynamic error', particularly if the value of K chosen is too large. So in choosing K we aim to minimise the noise variance, whilst also constraining the dynamic error to a low value. The smoothed samples also contain a fixed bias due to the measurement noise. In the second stage of the method this bias is removed.

Figure 3:
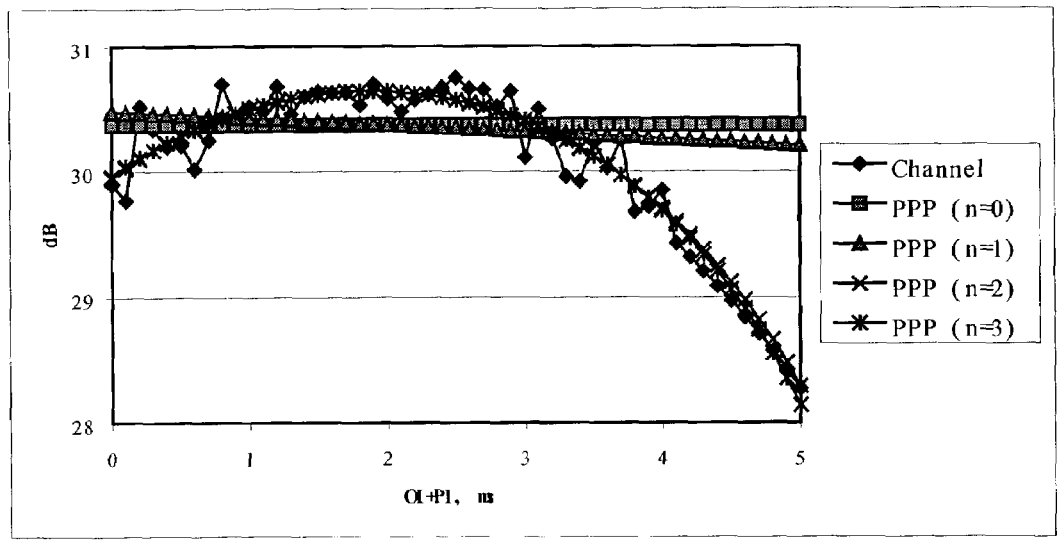
FIG. 3 illustrates a Least Mean Squares (LMS) fitting process.

In the third stage of the method, the future channel value is predicted, based on a historical set of m debiased 'smoothed' samples. The way this is done, using the Polynomial Prediction Procedure, is illustrated in FIG. 3. A Least-Mean-Squares (LMS) procedure is used to fit a polynomial curve of order n to the m historical (smoothed and debiased) samples over the Observation Interval. Predictions of future channel values are then obtained by extrapolating this polynomial into the future, over the Prediction Interval. Details of the LMS fitting algorithm are given below.

The example in FIG. 3 shows channel predictions over the 1 ms PI for various different orders, n, of the PPP from n=0 to n=3. (Note that the curve labelled 'Channel' in FIG. 3 shows debiased 'smoothed' measured samples (containing residual noise) over the 4 ms OI, but noise-free 'true' channel power values over the 1 ms PI. Whilst the curves in FIG. 3 are plotted on a dB scale, all of the PPP LMS curve fitting and extrapolation is actually carried out in the linear domain.) The simplest case is where n=0, and thus future channel samples are simply predicted to be the average of the debiased smoothed samples over the 4 ms OI. It can be seen, however, that using higher order polynomials gives significantly better results. In practice, it has been found that the quadratic polynomial (n=2) is close to optimal. With this order of polynomial, and realistic values of m, it can be shown that the processing overhead of the polynomial LMS fitting and extrapolation processes is significantly lower than the processing overhead of the AWGN smoothing process, which itself is significantly lower than the processing overhead of the data demodulation and detection processing.

The algorithm described above has the undesirable property that when the polynomial degree is n>0 the polynomial can have both positive and negative values. However, the true channel power can only be positive. Therefore the prediction algorithm has been modified in such a way that it excludes predictions of negative values of the channel power. As is evident from the description above, when n=0 the predicted channel power can only have positive values, as it is simply the average of the historical samples. Consequently if the polynomial of degree n>0 predicts a negative channel power, this polynomial may be replaced by the polynomial of degree n=0.

Application of the PPP technique can be envisaged in solving the problem of 'MCS Prediction' (MCSP), where MCS stands for 'Modulation and Coding Scheme'. MCSP is expected to play a significant role in successful implementation of the concept of fast Adaptive Modulation and Coding (AMC) in future (3rd and 4th) generation mobile wireless systems. In the downlink of such systems, the UE requests a transmission of data from the Base Station (BS), and specifies the appropriate MCS to be used from the AMC set. The appropriate MCS will depend on the instantaneous channel value. That is, if the received signal is strong then a higher order modulation such as QAM can be used (with high bit loading). Conversely, if the received signal is weak, a lower order modulation such as QPSK will be required, possibly with additional spreading (i.e. symbol repetition) and/or Forward Error Correction (FEC) coding. So if the UE knows the instantaneous channel value, it can select an appropriate MCS. The problem arises in that there will be a lag or 'feedback delay' between the UE (or BS) determining the appropriate value of MCS, and the actual transmission of the data burst to the UE. This lag is due to a number of reasons, such as measurement and encoding/decoding delay on the feedback channel, processing and scheduling delays at the BS etc. In order to overcome this lag, we need to be able to predict the channel state at some time in the future—i.e. at the time that the actual transmission will take place. This is a problem which can be solved through application of the Polynomial Power Prediction algorithm.

2 Details of the AWGN Smoothing Procedure

Let $h_0(t)$ be a noise-free complex channel and $a(t)$ be a modulation symbol complex amplitude. Then the fading channel power $x_0(t)=|a(t)h_0(t)|^2$. The measured channel power $x(t)$ is corrupted by AWGN $n(t)$ of a receiver, i.e.

$$x(t)=|a(t)h_0(t)+n(t)|^2 \quad (2.1)$$

Note that $n(t)$ could also represent interference from other transmitters. However, for notational simplicity we consider it to be AWGN only. We'll consider the channel to be normalised so that $<|h_0(t)|^2>=1$ and that the AWGN variance is $\sigma_0^2$, where $<>$ is a statistical expectation or average. Then $$<x(t)>=<|a(t)|^2>+\sigma_0^2 \quad (2.2)$$

The input (mean) SNR is $$\rho = \frac{<|a(t)|^2>}{\sigma_0^2} \quad (2.3)$$

If the complex channel is measured and predicted then the measurement and prediction errors are dependent upon the received SNR $\rho$, i.e. by the ratio of the average received signal power to the AWGN power. Analogously, when the channel power is measured and predicted then the measurement and prediction errors are given by the square of the predicting value divided by the variance $D_x$ of the error of the channel power measurement. The variance $D_x$ is equal to $D_x = <x(t)^2> - (<x(t)>)^2$. Thus the exactness of the non-biased channel power measurement is defined by the value $$\rho_x = \frac{(<x(t)> - \sigma_0^2)^2}{D_x} \quad (2.4)$$

It can be found (see Appendix A) that the variance $D_x$ is given by $$D_x = \sigma_0^4 (2\rho + 1) \quad (2.5)$$

Then $$\rho_x = \frac{\rho^2}{2\rho + 1} \quad (2.6)$$

This value will quantify the variation in the received signal samples prior to the smoothing procedure.

The AWGN correlation interval is equal to $\tau_N = 1/F$, where F is the input bandwidth of the receiver (i.e. substantially equal to the bandwidth of the transmitted signal). Therefore we can choose the sampling period (SP) to be greater than or equal to $\tau_N$ to achieve the AWGN independence. However, we must choose the SP to be smaller than the fading correlation interval $\tau_D$ in order to be able to predict the fading channel power.

Figure 1:
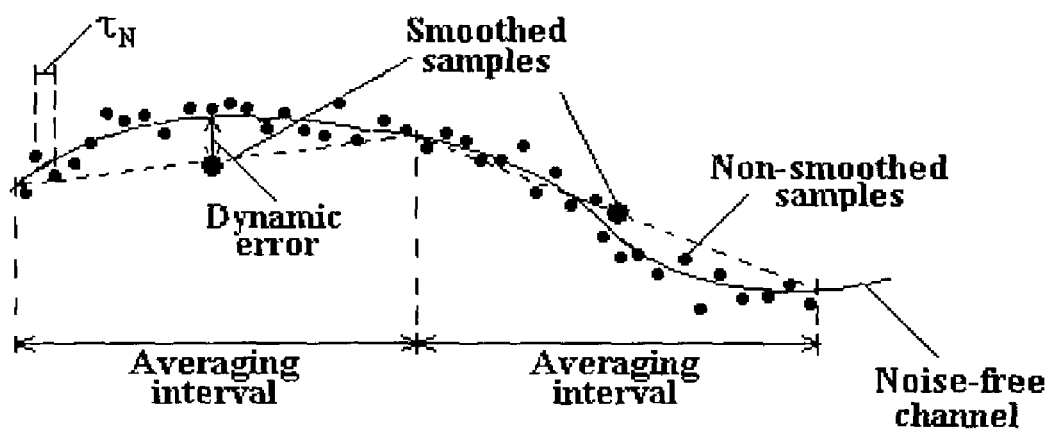
FIG. 1 illustrates an Additive White Gaussian Noise (AWGN) smoothing procedure.

We will introduce the AWGN smoothing procedure before then discussing the channel prediction. Let the SP be greater than or equal to the AWGN correlation interval $\tau_N$. Then we'll carry out the averaging of the fading channel power over the averaging interval (AI), which we denote $\tau_{aver}$. As a result a single 'smoothed' sample will be obtained from K measured samples, where $K = \tau_{aver}/\tau_N$, as illustrated in FIG. 1.

The AWGN smoothing procedure for the arbitrary $i^{th}$ averaging interval can be described as $$y_i = \frac{1}{K} \sum_{j=i-K/2}^{i+K/2} |a_j h_{0j} + n_j|^2 \quad (2.7)$$

The smoothed channel (2.7) has a bias due to the influence of the AWGN. In (2.2) the AWGN variance $\tau_0^2$ is known. Therefore we can eliminate this bias, replacing (2.7) by the non-biased smoothed power estimate of the form $$\tilde{y}_i = y_i - \sigma_0^2 \quad (2.8)$$

Now the exactness of the channel power measurement is defined by the value $$\rho_y = \frac{(<y(t)> - \sigma_0^2)^2}{D_y} \quad (2.9)$$

where $D_y$ is the variance of the smoothed measured channel power (i.e. after the AWGN smoothing procedure).

For simplicity we'll assume that the dynamic error is absent, i.e. we assume that the channel coefficients aren't changing over the averaging interval $\tau_{aver}$. This is true for the cases when the averaging interval $\tau_{aver}$ is much smaller than the fading correlation interval $\tau_D$, i.e. $\tau_{aver} << \tau_D$. It is derived in Appendix A that $$D_y = K^{-1} \sigma_0^4 (2\rho + 1) \quad (2.10)$$

Then $$\rho_y = K\rho_x = K \frac{\rho^2}{2\rho + 1} \quad (2.11)$$

It follows from (2.11) that the AWGN influence can be decreased by K times as a result of the smoothing procedure. Thus, the AWGN influence is reduced if the averaging time is increased. On the other hand, if the averaging time is increased then the dynamical error is increased (see FIG. 1). Thus, there is an optimal length of the averaging interval $\tau_{aver}$.

We consider one example. Let the input bandwidth be F=5 MHz (i.e. the SP must be $\tau_N \geq 0.2 \times 10^{-6}$s) and the averaging interval for the smoothing procedure $\tau_{aver} = 1 \times 10^{-3}$s. If $\tau_N = 0.233 \ 10^{-6}$s then $K = \tau_{aver}/\tau_N = 5000$. This means that we get 10.lg(5000)=37 dB reduction in the variability of the power measurement by averaging the measured power over 5000 samples (lg represents a logarithm to the base 10). This means that the result obtained for SNR=30 dB (no averaging) will also be valid for SNR~−7 dB (5000 sample averaging).

3. Details of the Polynomial Prediction Procedure

Suppose that we have m smoothed samples $\tilde{y}_k$ given by (2.8) on the observation interval (OI) and the averaging interval (AI) is equal to $\Delta$. Note that the channel power estimation on the OI does not require training signals. The task is to predict the channel power over the prediction interval (PI), i.e. several steps ahead. We denote the length of the OI and PI as being equal to $T = m\Delta$ and $T_1 = l\Delta$, accordingly.

Let the function $y_0(t)$ be the noise-free fading channel power. We'll propose that the function $y_0(t)$ can be presented on the full interval (OI+PI) as a polynomial of degree n, i.e.

$$y_0(\tau) = a_0 + a_2 \tau^2 + \ldots + a_n \tau^n \quad (3.1)$$

where $\tau$ is the moment in time. We consider that $\tau = 0$ for the right edge of the OI or for the left edge of the PI.

For discrete time $t_k = (k-0.5)\Delta$ and $\tau_{j-k} = (t_j - t_k) = (j-k)\Delta$. Then we have channel power samples on the OI at the time $\tau_0 = -0.5\Delta$, $\tau_{-1} = -1.5\Delta$, $\tau_{-2} = -2.5\Delta \ldots$, $\tau_{-m} = (-m-0.5)\Delta$ (see FIG. 2), where $m = T/\Delta$. The channel power is predicted at the instants (see FIG. 2) $\tau_1 = 0.5\Delta$, $\tau_2 = 1.5\Delta$, $\ldots$, $\tau_l = (l-0.5)\Delta$, where $l = T_1/\Delta$.

We'll find the polynomial coefficients $a_k$ on the basis of the least mean squares (LMS) algorithm taking into account the channel samples on the OI. The sum-squared error on the OI is given by $$E = \sum_{i=0}^{-m} [\tilde{y}(\tau_i) - (a_0 + a_1\tau_i + a_2\tau_i^2 + \ldots + a_n\tau_i^n)]^2 \quad (3.2)$$

We aim to minimise this sum-squared error over the OI by choosing suitable values of $a_k$. Therefore the linear equation set for the polynomial coefficient $a_k$ definition is $$\sum_{i=0}^{-m} [\tilde{y}(\tau_i) - (a_0 + a_1\tau_i + a_2\tau_i^2 + \ldots + a_n\tau_i^n)]\tau_i^q = 0, \quad (3.3)$$
$$(q = 0, 1, 2, \ldots, n)$$

It is necessary for determination of the polynomial coefficients that $m \geq n$, i.e. the number of samples over which we do the curve fit must be greater than the order of the polynomial.

When equation (3.3) is solved, the coefficients $a_k$ can be substituted into (3.1).

The above solution can alternatively be presented in matrix form. We introduce the $\{(m+1) \times (n+1)\}$ matrix $$D = \begin{Bmatrix} 1 & 0 & 0 & \ldots & 0 \\ 1 & (-\Delta) & (-\Delta)^2 & \ldots & (-\Delta)^n \\ 1 & (-2\Delta) & (-2\Delta)^2 & \ldots & (-2\Delta)^n \\ \ldots & \ldots & \ldots & \ldots & \ldots \\ 1 & (-m\Delta) & (-m\Delta)^2 & \ldots & (-m\Delta)^n \end{Bmatrix} \quad (3.4)$$

We also introduce the (n+1)-element column-vector $a = (a_0, a_1, a_2, \ldots, a_n)^T$ and the (m+1)-element column-vector $Y = [\tilde{y}(\tau_0), \tilde{y}(\tau_{-1}), \tilde{y}(\tau_{-2}), \ldots, \tilde{y}(\tau_{-m})]^T$, where $(.)^T$ is transpose. Then (3.2) can be re-written in the matrix form as $$E = (Y - Da)^T (Y - Da) \quad (3.5)$$

From the condition $$\frac{\partial E}{\partial a} = 0$$

we obtain that the unknown vector will be $$a = (D^T D)^{-1} D^T Y \quad (3.6)$$

The l-element predicted power vector $Y_1 = [y(\tau_1), y(\tau_2), y(\tau_3), \ldots, y(\tau_l)]^T$ is given by $$Y_1 = D_1 a = D_1 (D^T D)^{-1} D^T Y \quad (3.7)$$

where the $l \times (n+1)$-dimensional matrix $$D_1 = \begin{Bmatrix} 1 & \Delta & \Delta^2 & \ldots & \Delta^n \\ 1 & 2\Delta & (2\Delta)^2 & \ldots & (2\Delta)^n \\ 1 & 3\Delta & (3\Delta)^2 & \ldots & (3\Delta)^n \\ \ldots & \ldots & \ldots & \ldots & \ldots \\ 1 & l\Delta & (l\Delta)^2 & \ldots & (l\Delta)^n \end{Bmatrix} \quad (3.8)$$

It is seen from (3.4) and (3.8) that the elements of the matrices $D$ and $D_1$ depend on the sampling period $\Delta$, the number of samples over the OI $m = T/\Delta$ and the number of samples over the PI $l = T_1/\Delta$. Therefore the matrix $(D^T D)^{-1} D^T$ in (3.6) and the matrix $D_1(D^T D)^{-1} D^T$ in (3.8) can be pre-calculated and stored in the memory. This would make real-time implementation simpler.

In the simplest case $n=0$ the polynomial is constant and we have from (3.3) that $$a_0 = \frac{1}{m+1} \sum_{i=0}^{-m} \tilde{y}(\tau_i) \quad (3.9)$$

i.e. the predicted channel power is constant for all the temporal samples and equals the arithmetical mean of channel power on the observation interval:

$$y(\tau_1) = y(\tau_2) = \ldots = y(\tau_1) = a_0 \quad (3.10)$$

Now we'll illustrate the curves of the LMS fitting process. We choose the OI length 4 ms, the PI length 1 ms. FIG. 3 shows the curves of the LMS fitting process that correspond to the different polynomial degree $n=0,1,2$ and 3 and the curve of the channel power realisation. The channel power curve (denoted 'channel' in FIG. 3) is distorted by noise on OI and free of noise on PI.

We introduce the power prediction error (PPE) on the PI as $$\delta(dB) = 10 \lg(y) - 10 \lg(y_0) \quad (3.11)$$

where $y_0$ is the exact channel power on the PI and $y$ is the predicted channel power on the PI.

The described algorithm has a peculiar property that should be taken into account in use. When the polynomial degree is $n > 0$ the polynomial (3.1) can have both positive and negative values. However, the channel power can be only positive. Therefore the prediction algorithm should be modified so as to exclude predictions of negative values of the channel power.

We consider one possible approach to modify the above algorithm to exclude predictions of negative power. As it is shown above, when $n=0$ the predicted channel power is given by formula (3.9) and has only positive values, as it is simply the average of the historical samples. Consequently if the polynomial of degree $n > 0$ predicts a sample with negative channel power, this polynomial may be replaced by the polynomial of degree $n=0$ for this particular sample.

4. Simulation Results

Simulation results for the PPP method are now presented. In order to obtain statistically reliable results the cumulative distribution functions (CDFs) for the power prediction error (PPE) have been obtained. The PPE (3.11) depends on the channel parameters (maximum Doppler frequency, number of sinusoids, SNR) and on the PPP parameters (polynomial degree, OI length and PI length, sampling period, averaging interval). The CDF of the PPE gives the most complete information about the distribution of this error. The CDF curves for the PPE δ(dB) were obtained on the basis of Monte Carlo simulation. The simulation procedure consisted of 1000 experiments.

4.1 Channel Parameters

In order to carry out Monte Carlo simulations of the PPP algorithm we need to devise a suitable model for the Small Scale Fading of the channel against which to test this algorithm. The following is a description of the SSF model used.

The $k^{th}$ sample of the fading channel coefficient h(t) was simulated as $$h_k = k_{norm} \sum_{l=1}^{L} z_l \exp(j2\pi f_l k\Delta); \quad z_l = a_l \exp(j\phi_l) \quad (4.1)$$

where (for $l^{th}$ scatterer) $a_l$ is the amplitude, $\phi_l$ is the phase, $f_l = f_d \cos(\phi_l)$ is the Doppler frequency, $\phi_l$ is the incident angle with respect to the mobile motion, $f_d$ is the maximum Doppler frequency, L is the number of sinusoids, $j = \sqrt{-1}$, $k_{norm}$ is the normalising factor, defined by SNR.

The channel model (4.1) proposes that the number of sinusoids L, the amplitude $a_l$, phase $\phi_l$ and the incident angle $\phi_l$ (for $l^{th}$ sinusoid) are random values. The number of sinusoids L is uniformly distributed on the interval [1 . . . (2$N_0$−1)], the power $|a_l|^2$ is uniformly distributed on the interval [0 . . . 2], the incident angle $\phi_l$ is uniformly distributed on the interval [0 . . . π], and phase $\phi_l$ is uniformly distributed on the interval [0 . . . 2π]. When the number of sinusoids L is increased then this channel model (4.1) tends to the well-known Jakes channel model. However, the model (4.1) is more general in that all of its parameters are random values. The mean number of sinusoids $N_0$ and the maximum Doppler frequency $f_d$ only must be specified prior to the simulation.

The channel model parameters are chosen as follows:

the maximum Doppler frequency $f_d$=50 Hz;

the mean number of sinusoids $N_0$=3 and $N_0$=16.

4.2. Parameters of Polynomial Power Predictor

We consider two values of the prediction length: namely prediction ahead by 1 ms (1st variant) and by 2 ms (2nd variant). The other parameters are the same for both variants and are as follows:

SNR at the PPP input is equal to −5, 5 and 15 dB;

the input bandwidth of the receiver F=5 MHz therefore the AWGN correlation interval is equal to $\tau^N$=1/F=0.2×10$^{-3}$ ms.

the SP equals $\tau_N$ or 10$\tau_N$ (i.e. 0.2×10$^{-3}$ ms or 2×10$^{-3}$ ms);

the OI length is 3 ms;

the averaging interval is 1 ms. Thus this interval includes K=5000 or 500 channel samples, depending on the value of the SP;

the polynomial degree n=2. This value has been chose because it has been found that the quadratic polynomial is close to optimal in a wide range of experiments.

Figure 2:
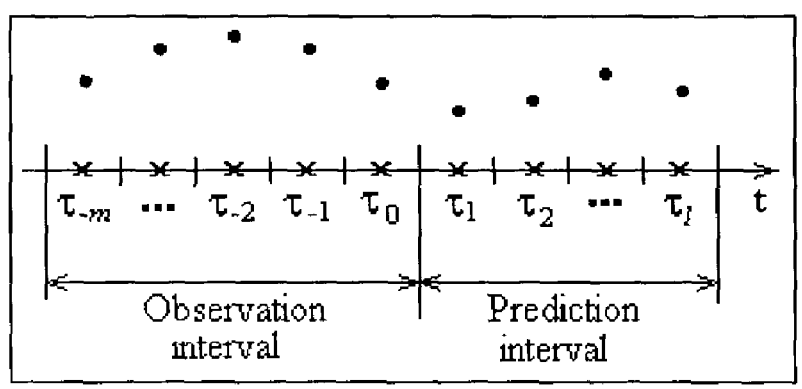
FIG. 2 illustrates a prediction process.

For the quadratic polynomial we can use three or more samples on OI, i.e. m≧2 (see FIG. 2). If three samples are used then the matrix $D_1(D^TD)^{-1}D^T$ in (3.8) is given by $$D_1(D^TD)^{-1}D^T = \begin{Bmatrix} 3 & -3 & 1 \\ 6 & -8 & 3 \end{Bmatrix} \quad (4.2)$$

and the main formula (3.7) takes a form $$y(\tau_1) = 3\bar{y}(\tau_{-1}) + \bar{y}(\tau_{-2}) \quad (4.3)$$

$$y(\tau_2) = 6\bar{y}(\tau_0) - 8\bar{y}(\tau_{-1}) + 3\bar{y}(\tau_{-2}) \quad (4.4)$$

where $\tau_0$=−0.5Δ, $\tau_{-1}$=−1.5Δ, $\tau_{-2}$=−2.5Δ, $\tau_1$=0.5Δ, $\tau_2$=1.5Δ (see FIG. 2).

It is interesting to note that the matrix $D_1(D^TD)^{-1}D^T$ does not depend on the averaging interval length.

4.3 Simulation Results

Figure 4:
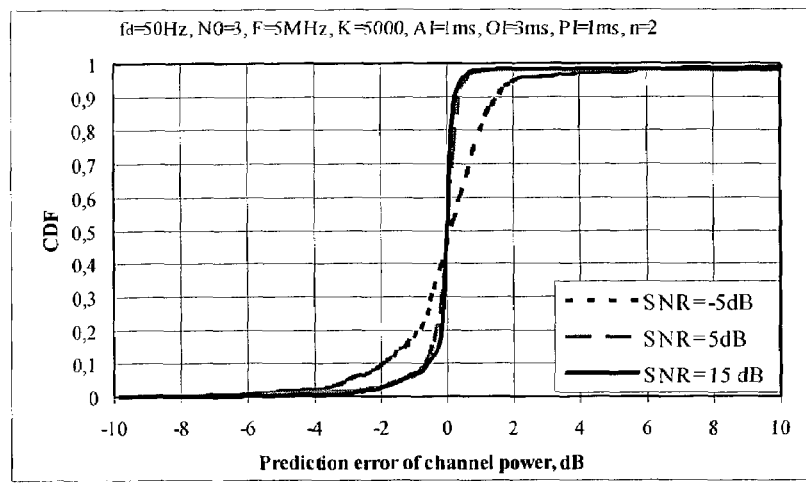
FIG. 4 is a plot of CDF (cumulative distribution function) against Power Prediction Error (PPE) (dB), when the signal-to-noise ratio (SNR)=−5, 5 and 15 dB, the observation interval (OI)=3 ms, the prediction interval (PI)=1 ms, the number of samples used in smoothing (K)=5000, and the mean sinusoid number ($N_0$)=3.
Figure 5:
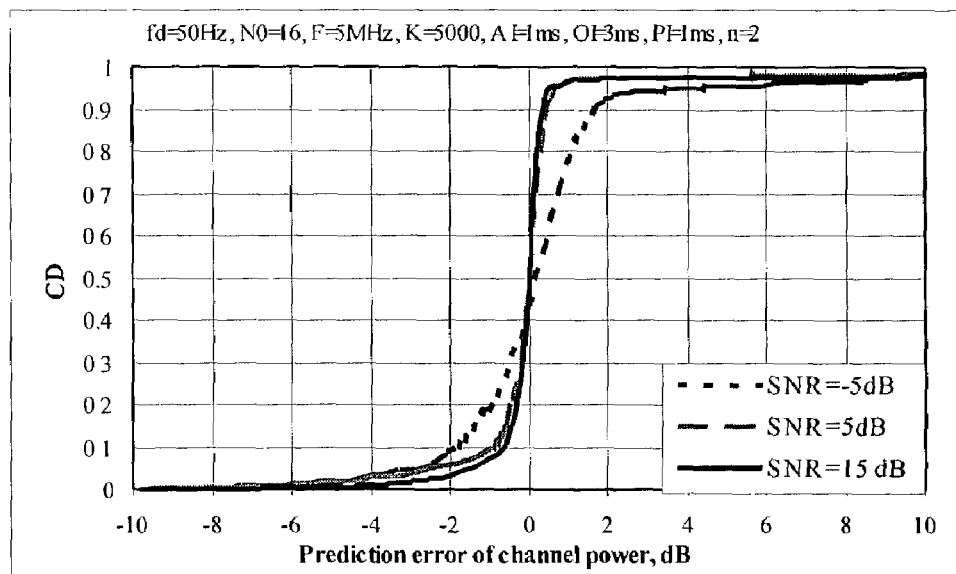
FIG. 5 is a plot of CDF against PPE (dB) when SNR=−5, 5 and 15 dB, OI=3 ms, PI=1 ms, K=5000, $N_0$=16.
Figure 6:
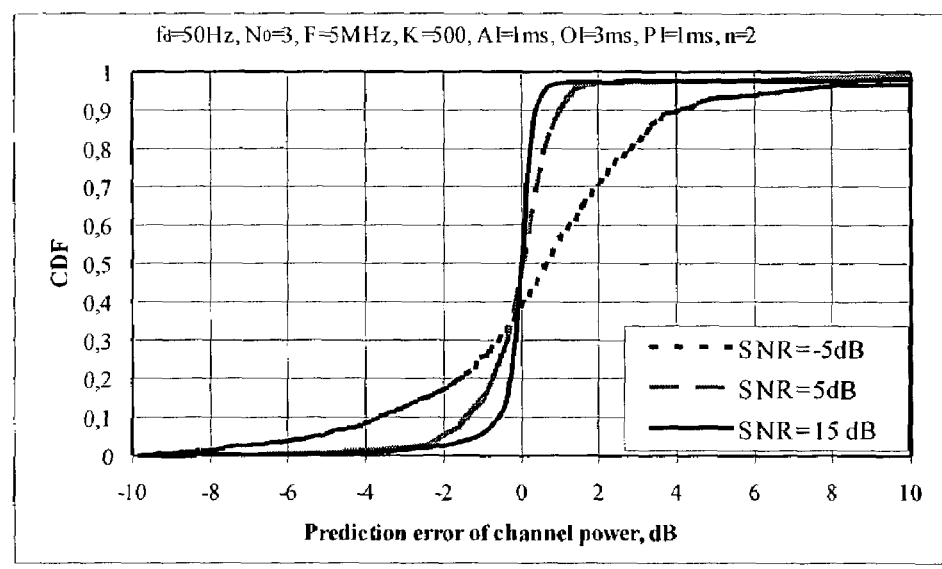
FIG. 6 is a plot of CDF against PPE (dB) when SNR=−5, 5 and 15 dB, OI=3 ms, PI=1 ms, K=500, $N_0$=3.
Figure 7:
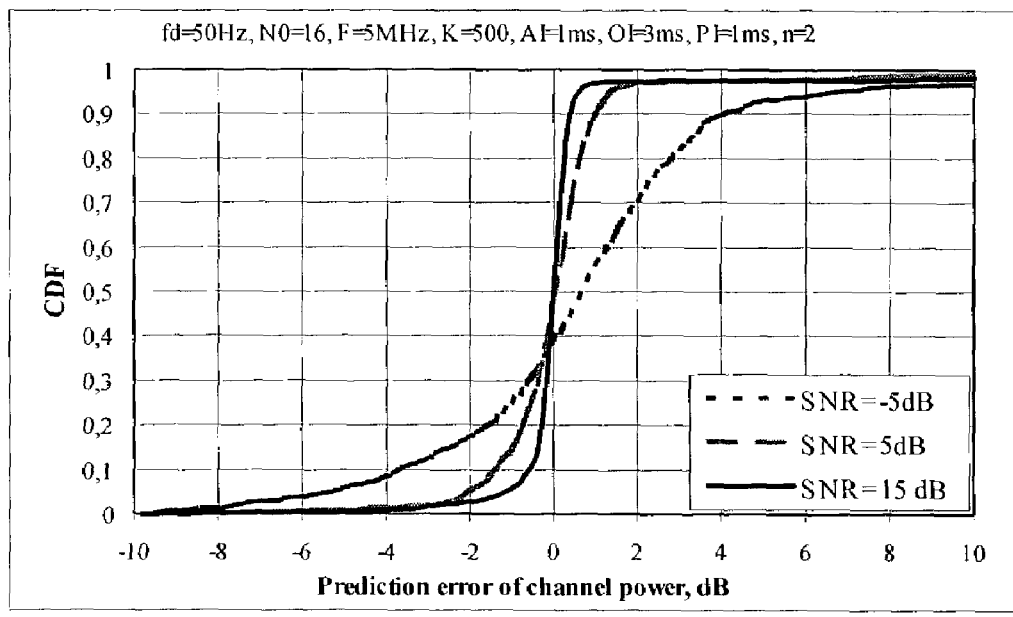
FIG. 7 is a plot of CDF against PPE (dB) when SNR=−5, 5 and 15 dB, OI=3 ms, PI=1 ms, K=500, $N_0$=16.

FIGS. 4, 5, 6 and 7 show the results of simulations of the first variant when the prediction is carried out for 1 ms ahead. SNR=−5, 5 and 15 dB and the input bandwidth is F=5 MHz. The OI length is 3 ms and the averaging interval is 1 ms. The mean number of sinusoids $N_0$=3 and $N_0$=16. FIGS. 4 and 5 correspond to the number of samples on the averaging interval K=5000, i.e. the SP is $\tau_N$=1/F=0.2×10$^{-3}$ ms. FIGS. 6 and 7 give the results for the number of samples on the averaging interval K=500, i.e. the SP is $\tau^N$=10×1/F=0.2×10$^{-3}$ ms.

Figure 8:
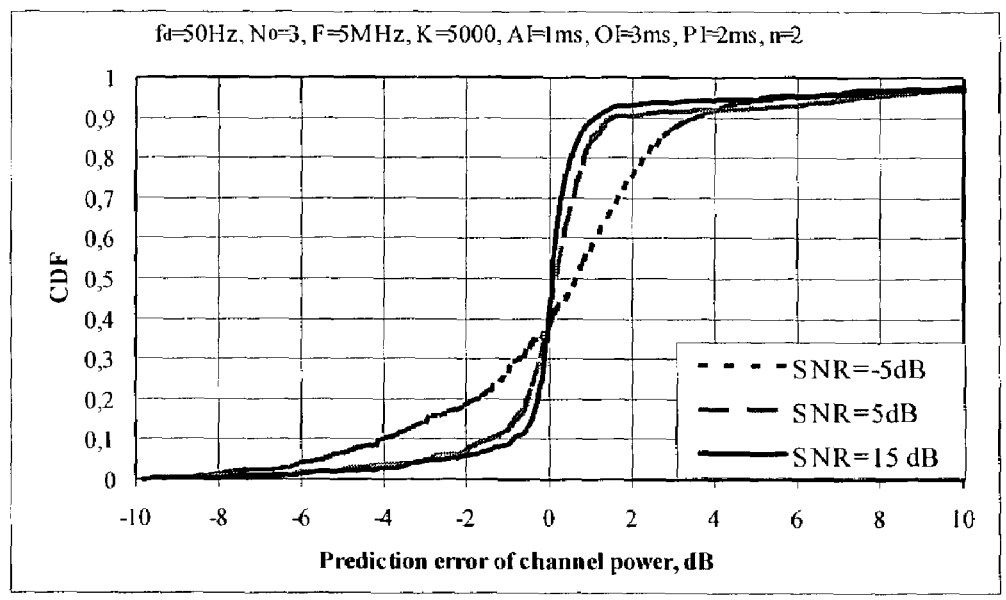
FIG. 8 is a plot of CDF against PPE (dB) when SNR=−5, 5 and 15 dB, OI=3 ms, PI=2 ms, K=5000, $N_0$=3.
Figure 9:
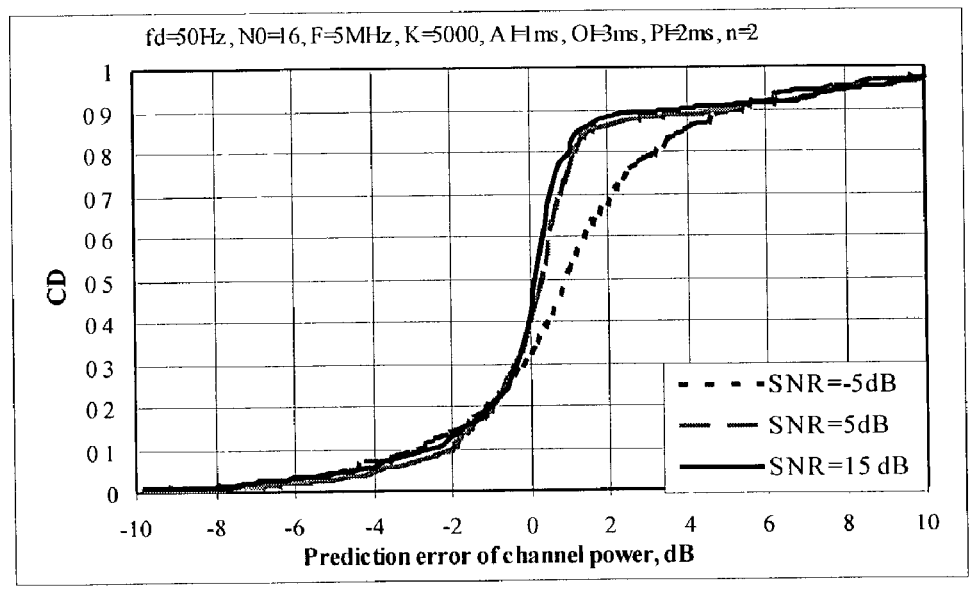
FIG. 9 is a plot of CDF against PPE (dB) when SNR=−5, 5 and 15 dB, OI=3 ms, PI=2 ms, K=5000, $N_0$=16.
Figure 10:
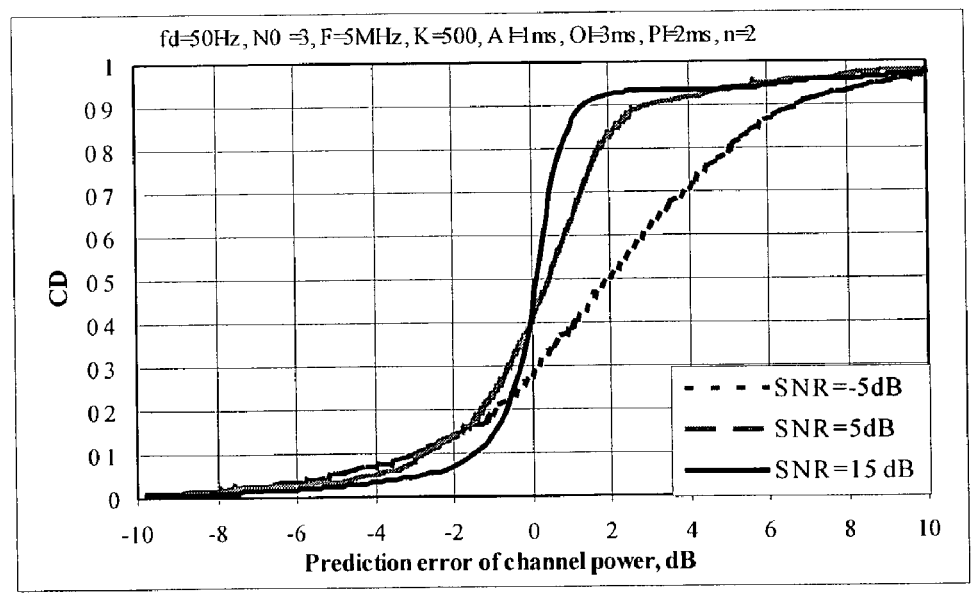
FIG. 10 is a plot of CDF against PPE (dB) when SNR=−5, 5 and 15 dB, OI=3 ms, PI=2 ms, K=500, $N_0$=3.
Figure 11:
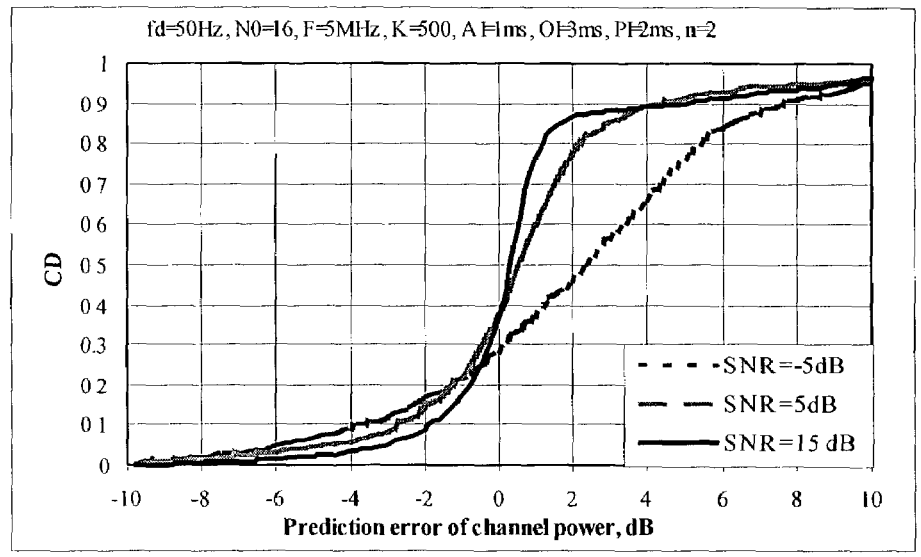
FIG. 11 is a plot of CDF against PPE (dB) when SNR=−5, 5 and 15 dB, OI=3 ms, PI=2 ms, K=500, $N_0$=16.
Figure 12:
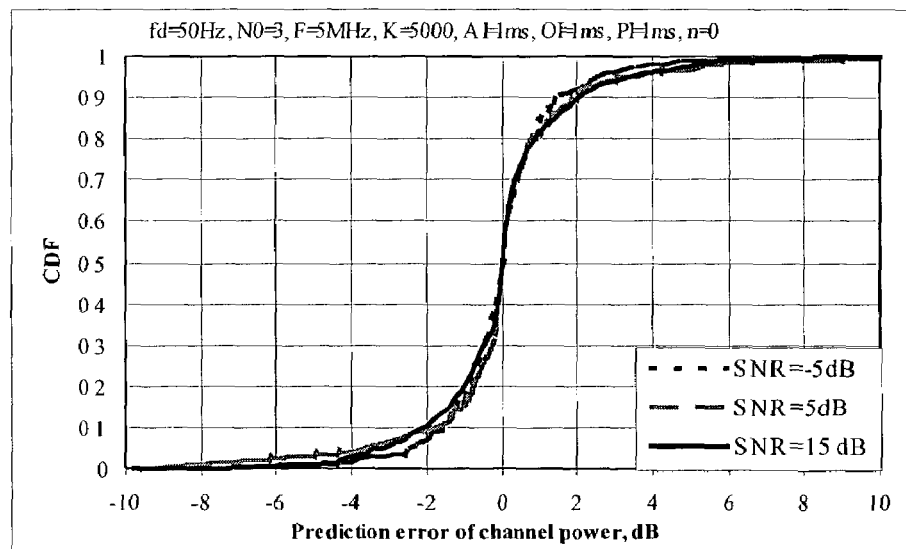
FIG. 12 is a plot of CDF against PPE (dB) when SNR=−5, 5 and 15 dB, OI=1 ms, PI=1 ms, K=5000, $N_0$=3.
Figure 13:
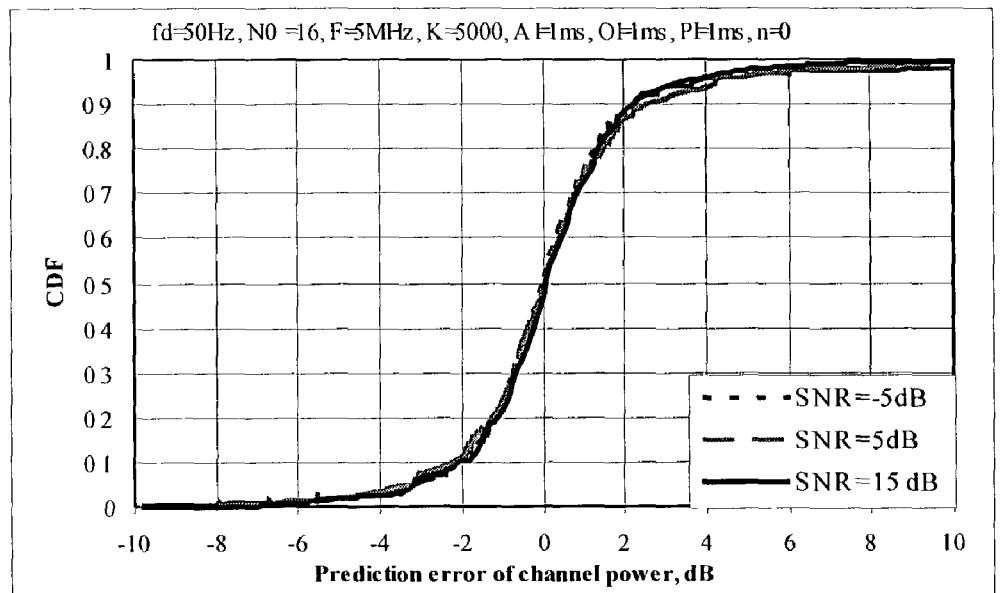
FIG. 13 is a plot of CDF against PPE (dB) when SNR=−5, 5 and 15 dB, OI=1 ms, PI=1 ms, K=5000, $N_0$=16.
Figure 14:
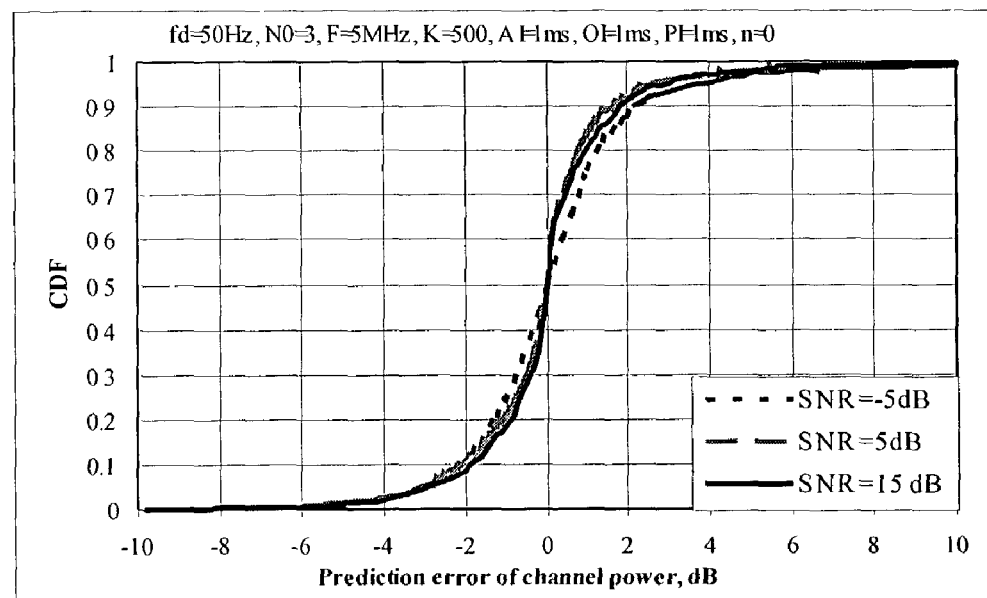
FIG. 14 is a plot of CDF against PPE (dB) when SNR=−5, 5 and 15 dB, OI=1 ms, PI=1 ms, K=500, $N_0$=3.
Figure 15:
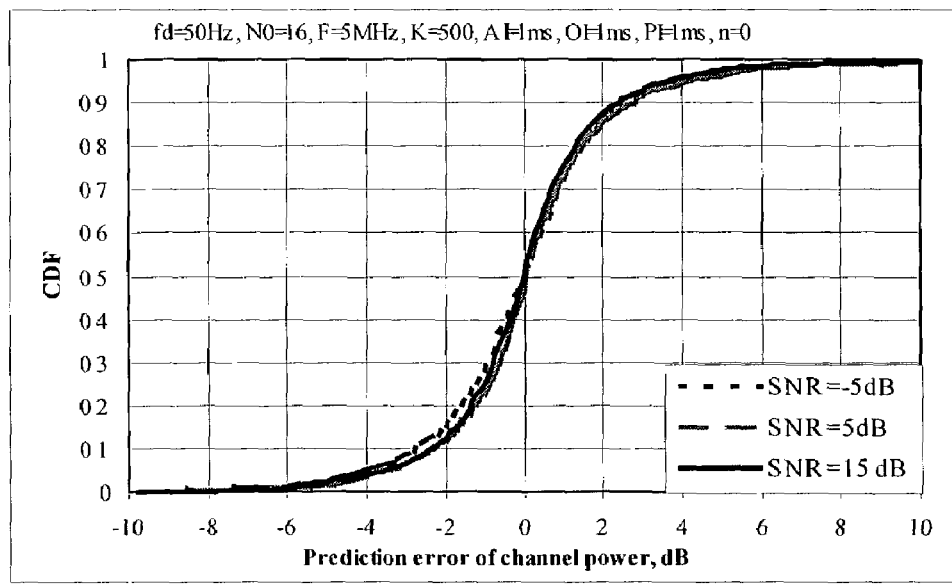
FIG. 15 is a plot of CDF against PPE (dB) when SNR=−5, 5 and 15 dB, OI=1 ms, PI=1 ms, K=500, $N_0$=16.
Figure 16:
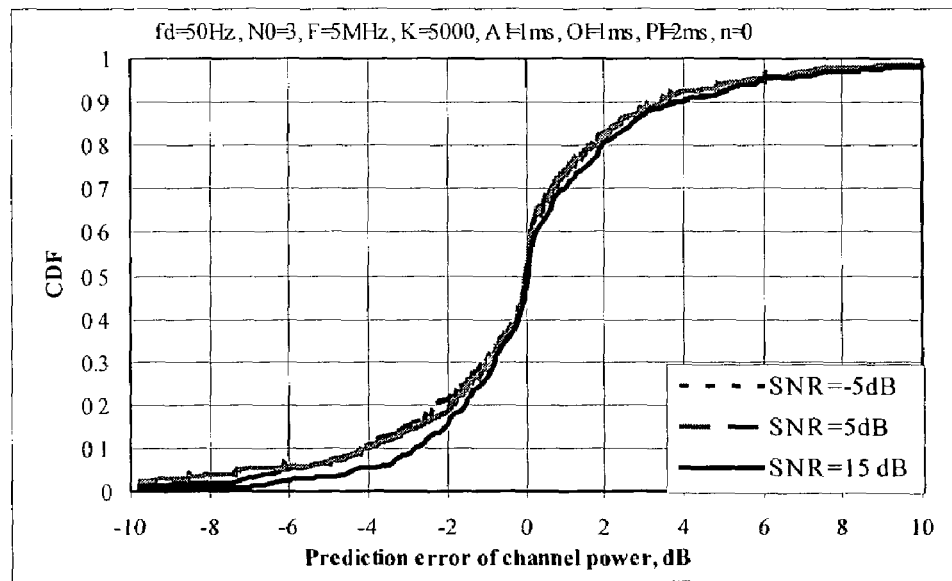
FIG. 16 is a plot of CDF against PPE (dB) when SNR=−5, 5 and 15 dB, OI=1 ms, PI=2 ms, K=5000, $N_0$=3.
Figure 17:
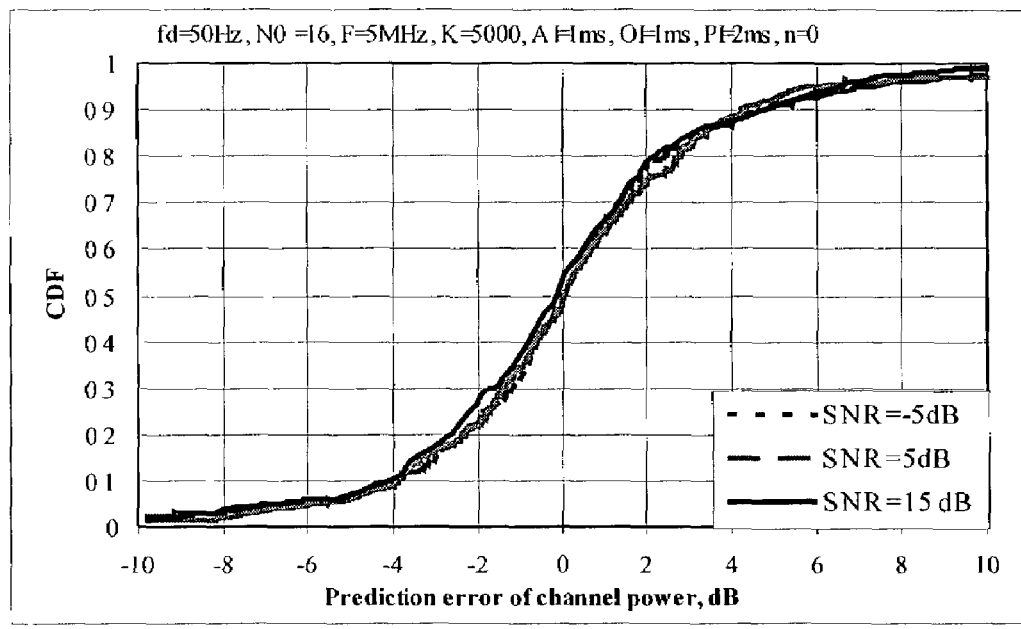
FIG. 17 is a plot of CDF against PPE (dB) when SNR=−5, 5 and 15 dB, OI=1 ms, PI=2 ms, K=5000, $N_0$=16.
Figure 18:
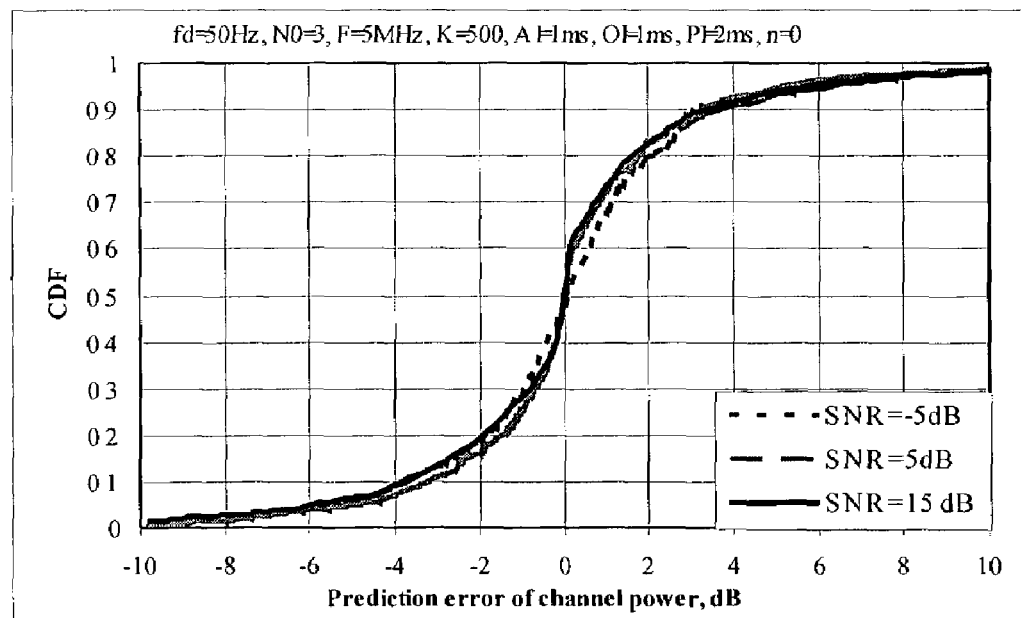
FIG. 18 is a plot of CDF against PPE (dB) when SNR=−5, 5 and 15 dB, OI=1 ms, PI=2 ms, K=500, $N_0$=3.
Figure 19:
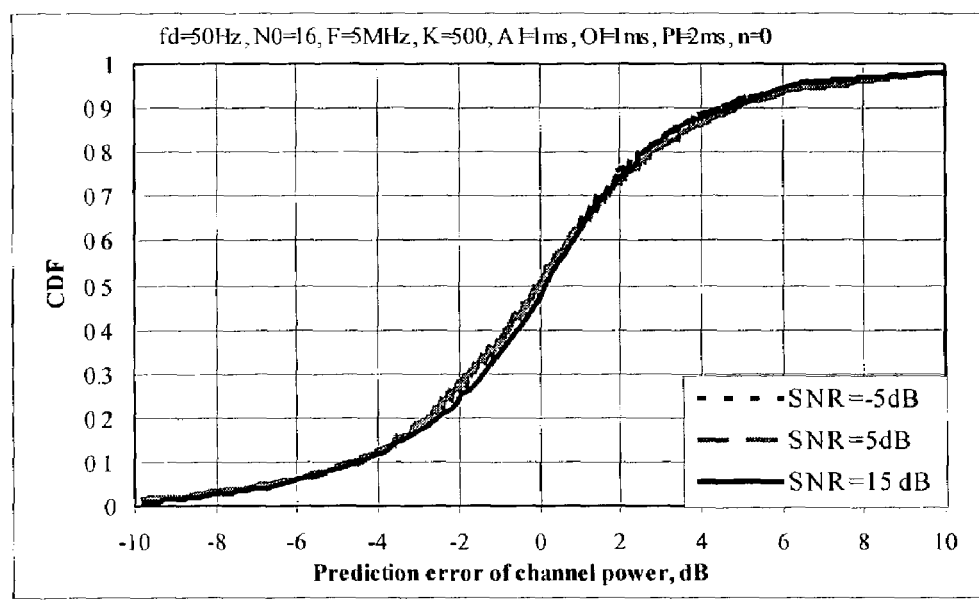
FIG. 19 is a plot of CDF against PPE (dB) when SNR=−5, 5 and 15 dB, OI=1 ms, PI=2 ms, K=500, $N_0$=16.

FIGS. 8, 9, 10 and 11 show the results for the second variant with a longer channel prediction (2 ms ahead). SNR=−5, 5 and 15 dB and the input bandwidth is F=5 MHz. The OI length is 3 ms and the averaging interval is 1 ms. The mean number of sinusoids $N_0$=3 and $N_0$=16. FIGS. 8 and 9 correspond to the number of samples on the averaging interval K=10000, i.e. the SP is $\tau_N$=1/F=0.2×10$^{-3}$ ms. FIGS. 10 and 11 give the results for the number of samples on the averaging interval K=1000, i.e. the SP is $\tau^N$=10×1/F=0.2×10$^{-3}$ ms). All the presented results are summarised in Table 1. It is shown in FIGS. 4 and 5 and in Table 1 that the use of the smoothing procedure gives the possibility to predict the fading channel with very low SNR with a good accuracy. For example, if the maximum Doppler frequency $f_d$=50 Hz, the input bandwidth F=5 MHz, the AI=1 ms, then the PPE with the probability 80% will not exceed the interval ±(0.5 . . . 0.6)dB for SNR=5 and 15 dB and for the prediction 1 ms ahead. This error will not exceed the interval ±1.8 dB when SNR=−5 dB.

We also consider a 'reference' or 'baseline' case when the predicted channel power is simply equal to the measured and smoothed power. In this case the observation interval consists of one averaging interval and there is one smoothed sample (see FIG. 2), i.e. the OI length is 1 ms and the averaging interval is also 1 ms. The predicted channel power for this case is made to be equal to this smoothed sample power. This case is interesting because it indicates how rapidly the channel power is in fact changing. The corresponding results for this reference case are given in Table 2 and in FIGS. 12 to 19. It can be seen from Table 2 that the PPE in this reference case only weakly depends on the SNR. Comparing the results of Table 1 and Table 2 we can also see that by using the PPP with the preferred polynomial order (n=2) we are able to significantly reduce the power prediction error. The PPP with the quadratic polynomial (n=2) has smaller error then the reference case due to its ability to better track the fading channel.

TABLE 1

PPE ensured with probability 80%
(Doppler $f_d$ = 50 Hz; bandwidth F = 5 MHz; polynomial degree n = 2)

| PI, ms | OI, ms | AI, ms | Sample number on AI | Mean sinusoid number | SNR, dB −5 | SNR, dB 5 | SNR, dB 15 |
|---|---|---|---|---|---|---|---|
| 1 | 3 | 1 | 5000 | 3 | ±1.6 | ±0.6 | ±0.5 |
| 1 | 3 | 1 | 5000 | 16 | ±1.8 | ±0.6 | ±0.5 |
| 1 | 3 | 1 | 500 | 3 | ±3.7 | ±1.2 | ±0.5 |
| 1 | 3 | 1 | 500 | 16 | ±3.7 | ±1.2 | ±0.5 |
| 2 | 3 | 1 | 5000 | 3 | ±3.7 | ±1.4 | ±0.9 |
| 2 | 3 | 1 | 5000 | 16 | −2.7 ÷ 4.9 | ±2.7 | ±2.2 |
| 2 | 3 | 1 | 500 | 3 | −2.8 ÷ 6.6 | ±2.7 | ±1.4 |
| 2 | 3 | 1 | 500 | 16 | −3.2 ÷ 7.2 | −2.6 ÷ 4.0 | ±2.7 |

TABLE 2

PPE ensured with probability 80% when the predicted power equals the measured and smoothed power (Doppler $f_d$ = 50 Hz; bandwidth F = 5 MHz)

| PI, ms | OI, ms | AI, ms | Sample number on AI | Mean sinusoid number | SNR, dB −5 | SNR, dB 5 | SNR, dB 15 |
|---|---|---|---|---|---|---|---|
| 1 | 1 | 1 | 5000 | 3 | ±2.0 | ±2.0 | ±2.0 |
| 1 | 1 | 1 | 5000 | 16 | ±2.2 | ±2.2 | ±2.2 |
| 1 | 1 | 1 | 500 | 3 | ±2.0 | ±2.0 | ±2.0 |
| 1 | 1 | 1 | 500 | 16 | ±2.4 | ±2.4 | ±2.4 |
| 2 | 1 | 1 | 5000 | 3 | ±3.7 | ±3.7 | ±3.7 |
| 2 | 1 | 1 | 5000 | 16 | ±4.3 | ±4.3 | ±4.3 |
| 2 | 1 | 1 | 500 | 3 | ±3.6 | ±3.6 | ±3.6 |
| 2 | 1 | 1 | 500 | 16 | ±4.6 | ±4.6 | ±4.6 |

5. Conclusions

The polynomial power predictor (PPP) for a fading channel with very low SNR has been considered in detail above. The PPP does not require a training sequence (i.e. use of known modulation symbols) for estimation of the channel power. This estimation can be carried out on the basis of the data sequence with the given symbol rate. PPP differs from the linear, Fourier and non-linear predictors by the simplicity of the calculations involved. Within the PPP, two main steps are carried out for the channel prediction. The first step is the AWGN smoothing procedure and the second one is the channel prediction.

The smoothing procedure is based on the increase of the channel estimation accuracy by means of the AWGN averaging. This is possible because the input bandwidth of the receiver is considerably larger than the Doppler spectrum width. If the averaging interval consists of K samples then the AWGN influence is decreased by K times. This can be interpreted as an SNR increase at the PPP input. The influence of the AWGN decreases significantly with large K There is an optimal length of the averaging interval. This is because as the averaging time is increased the influence of the AWGN is decreased. On the other hand, if the averaging time is increased too much then the channel estimation is corrupted by the dynamical error.

The channel prediction, which takes place during the second step, models the change of the channel power on the observation and prediction intervals in the form of the polynomial function. It has been found that the quadratic polynomial is close to optimal, as it gives the smallest power prediction error (PPE). The value of this power prediction error depends on the length of the observation interval (OI) and the prediction interval (PI). These intervals must be less than the fading correlation interval. It is necessary to take into account that the approximating polynomial can have negative values, which cannot correspond to the real channel because the channel power must be a positive value. To solve this problem, for those instances where negative power values are predicted, it is proposed to replace the approximating polynomial by a polynomial of zero-degree. By adding this simple modification we can ensure that the PPP gives predictions with only positive channel power.

Monte Carlo simulation results have been presented for the channel model in which all parameters are random values. The mean number of sinusoids $N_0$ and the maximum Doppler frequency $f_d$ only are specified in the simulation. As a result of the simulation the cumulative distribution function (CDF) for the power prediction error (PPE) is obtained. The results show that the use of the smoothing procedure gives the possibility to predict the fading channel with very low SNR (from −5 dB up to 15 dB) with a good accuracy.

For example, consider the case where the maximum Doppler frequency $f_d$=50 Hz, the input bandwidth F=5 MHz, the AI=1 ms and the number of the averaged samples K=5000. Then the PPE with the probability 80% will not exceed the interval ±(0.5 . . . 0.6)dB for SNR=5 and 15 dB and for the prediction 1 ms ahead. This error will not exceed the interval ±1.8 dB when SNR=−5 dB. These prediction errors were compared with errors when the predicted channel power was equal to the measured and smoothed power (i.e. as a 'reference' or 'baseline' scenario). In this reference scenario the observation interval consists of one averaging interval and there is one smoothed sample and the predicted channel power is equal to this smoothed sample power. The corresponding results show that the PPP with n=2 has smaller error than the baseline scenario. This improvement is due to the enhanced channel tracking. For example, the PPE with the probability 80% will not exceed the interval ±2.2 dB for SNR=−5, 5 and 15 dB and for the prediction 1 ms ahead.

Simulation results have been given for the maximum Doppler frequency equal to 50 Hz. However, these results are more general, being also valid for different Doppler frequencies if we change other parameters proportionally. For example, if the Doppler frequency decreases by Q times then we'll obtain the same accuracy for a prediction Q times further into the future.

Thus the polynomial power predictor has the following main advantages:

- it does not require training signals;
- it predicts the fading channel power with low SNR (from −5 dB up to 15 dB) with good accuracy;
- it accurately predicts the fading channel power based on historical observations gathered over a very short time interval. This is because the observation interval can be chosen to be significantly shorter than the fading correlation interval. This would be impossible for many alternative fading channel prediction algorithms, such as the linear predictor;
- it has a very simple practical realisation.

6. Summary

As explained above, the PPP technique in accordance with an embodiment of the invention involves the following elements and steps:

Obtain noisy measured historical samples of channel power (e.g. received data symbols)

Carry out the AWGN smoothing procedure on blocks of K samples (over the Averaging Interval), to obtain a single smoothed sample.

Remove the AWGN bias

Carry out the Polynomial Prediction Procedure using the smoothed samples over the Observation Interval, to predict a future channel power value. This is done by LMS curve fitting and extrapolation. It has been found that a second order (quadratic) polynomial is close to optimal.

Apply modification to exclude predictions of negative power

The PPP technique works well over the short range of future time, and is computationally relatively cheap. Indeed, the technique leads to a significant reduction in processing required in order to carry out MCS prediction, which is a necessary step in implementing fast Adaptive Modulation and Coding in future 3rd and 4th generation mobile wireless systems.

Appendix A—Derivation of some Formulae

The variance $D_y$ is equal to $$D_y = <y_i^2> - (<y_i>)^2 \qquad (A1)$$

where the smoothed channel power $y_i$ is given by (2.7).

First we calculate the value $<y_i^2>$ equal to $$<y_i^2> = \frac{1}{K^2} \sum_{j=i-K/2}^{i+K/2} \sum_{l=i-K/2}^{l+K/2} |a_j h_{0j} + n_j|^2 |a_l h_{0l} + n_l|^2 > \qquad (A2)$$

Omitting index i and taking into account the channel normalisation ($<|h_0(t)|^2>=1$) we can obtain on the basis of numerous consecutive and cumbersome transformations that $$<y^2> = \frac{1}{K^2} \sum_j \sum_l <(|ah_0|^2 + ah_0 n_j^* + a^* h_0^* n_j + |n_j|^2) \times \qquad (A3)$$

$$(|ah_0|^2 + ah_0 n_l^* + a^* h_0^* n_l + |n_l|^2)>$$

$$= \frac{1}{K^2} \left( K^2 |a|^4 + 2K^2 |a|^2 \sigma_0^2 + 2K|a|^2 \sigma_0^2 \sum_j \sum_l <|n_j|^2 |n_l|^2> \right)$$

Now we must calculate the value $$A = \frac{1}{K^2} \sum_j \sum_l <|n_j|^2 |n_l|^2> \qquad (A4)$$

As a result of further numerous transformations we can obtain that $$A = \frac{1}{K^2} \sum_j <|n_j|^4> + \frac{1}{K^2} \sum_j \sum_{l \neq j} <|n_j|^2> <|n_l|^2> \qquad (A5)$$

$$= \frac{1}{K^2} \sum_j <|n_j|^4> + \frac{1}{K^2} K(K-1)\sigma_0^4$$

$$= \frac{1}{K^2} \sum_j <(|n_j'|^2 + |n_j''|^2)^2> + \left(1 - \frac{1}{K}\right)\sigma_0^4$$

$$= \frac{1}{K^2} \sum_j (<|n_j'|^4> + <|n_j''|^4> + 2<|n_j'|^2> <|n_j''|^2>) + \left(1 - \frac{1}{K}\right)\sigma_0^4$$

where n', and n", are real and imaginary parts of AWGN having zero means and variances equal to $0.5\sigma_0^2$ for each part. For the AWGN we have that the 4th central moment is equal to $$<|n_j'|^4> = <|n_l''|^4> = 3\left(\frac{\sigma_0^2}{2}\right)^2 \qquad (A6)$$

Substituting (A6) into (A5) we obtain that $$A = \sigma_0^4 \left(1 + \frac{1}{K}\right) \qquad (A7)$$

Now we can obtain from (A3) and (A7) that $$<y^2> = |a|^4 + 2\left(1 + \frac{1}{K}\right)|a|^2 \sigma_0^2 + \left(1 + \frac{1}{K}\right)\sigma_0^4 \qquad (A8)$$

Substituting (A8) and (2.2) into (A1) we'll have $$D_y = \frac{1}{K}\sigma_0^4 (2\rho + 1) \qquad (A9)$$

where SNR $\rho$ is defined in (2.3).

Thus if K=1 then y(t)=x(t) and we have (2.5) from (A9). If K>1 we have (2.10) from (A9).

APPENDIX B

List of Abbreviations

| | |
|---|---|
| AI | Averaging Interval |
| AMC | Adaptive Modulation and Coding |
| AWGN | Additive White Gaussian Noise |
| BS | Base Station |
| CDF | Cumulative Distribution Function |
| FEC | Forward Error Correction |
| LMS | Least Mean Squares |
| MCS | Modulation and Coding Scheme |
| MCSP | MCS Prediction |
| MIMO | Multiple-Input-Multiple-Output |
| OI | Observation Interval |
| PI | Prediction Interval |
| PPE | Power Prediction Error |
| PPP | Polynomial Power Predictor |
| QAM | Quadrature Amplitude Modulation |
| QPSK | Quadrature Phase Shift Keying |
| SNR | Signal to Noise Ratio |
| SP | Sampling Period |
| SSF | Small Scale Fading |
| UE | User Equipment |

What is claimed is:

1. A method of predicting the power of a received wireless signal, the method comprising the steps of:
    sampling the power of the received wireless signal over an observation interval to obtain a first series of values representative of the power of the received wireless signal over the observation interval;
    performing a smoothing operation on the first series of values to give a series of smoothed samples over the observation interval, wherein the number of smoothed samples is less than the number of values in the first series of values; and
    extrapolating the smoothed samples beyond the observation interval to predict the future power of the received wireless signal.

2. A method as claimed in claim 1, wherein the step of extrapolating comprises:
    performing least mean squares curve fitting on the smoothed samples; and then extrapolation of the fitted curve beyond the observation interval.

3. A method as claimed in claim 1, wherein the step of performing least mean squares curve fitting comprises fitting a polynomial curve to the smoothed samples.

4. A method as claimed in claim 3, wherein the polynomial curve is a second order polynomial.

5. A method as claimed in claim 1, wherein the step of performing the smoothing operation comprises performing an additive white gaussian noise smoothing procedure.

6. A method as claimed in claim 5, wherein the step of performing the additive white gaussian noise smoothing procedure is followed by a further step of removing the bias due to the Influence of the additive white gaussian noise.

7. A method as claimed in claim 1 further comprising the step of excluding any predictions of negative power.

8. A method as claimed in claim 1 performed by signal processing apparatus in a mobile device.

9. A method as claimed in claim 1 performed by signal processing apparatus at a base station.

10. A method of predicting the power of a received wireless signal, the method comprising the steps of:
    sampling the power of the received wireless signal over an observation interval to obtain a first series of values representative of the power of the received wireless signal over the observation interval;
    performing an additive white gaussian noise smoothing operation on the first series of values to give a series of smoothed samples over the observation interval, and removing the bias due to the influence of the additive white gaussian noise;
    performing least mean squares curve fitting on the smoothed samples;
    fitting a second order polynomial curve to the smoothed samples; and
    extrapolating the fitted curve beyond the observation interval to predict the future power of the received wireless signal.

11. A wireless device having signal processing apparatus, the signal processing apparatus being operable to predict the power of a wireless signal received by the wireless device, the signal processing apparatus being arranged to:
    sample the power of the received wireless signal over an observation interval to obtain a first series of values representative of the power of the received wireless signal over the observation interval;
    perform a smoothing operation on the first series of values to give a series of smoothed samples over the observation interval; and
    extrapolate the smoothed samples beyond the observation interval to predict the future power of the received wireless signal.

12. A wireless device having signal processing apparatus, the signal processing apparatus being operable to predict the power of a wireless signal received by the wireless device, the signal processing apparatus being arranged to:
    sample the power of the received wireless signal over an observation interval to obtain a first series of values representative of the power of the received wireless signal over the observation interval;
    perform an additive white gaussian noise smoothing operation on the first series of values to give a series of smoothed samples over the observation interval, and remove the bias due to the influence of the additive white gaussian noise;
    perform least mean squares curve fitting on the smoothed samples;
    fit a second order polynomial curve to the smoothed samples; and
    extrapolate the fitted curve beyond the observation interval to predict the future power of the received wireless signal.

13. A wireless communications network including a plurality of wireless devices, each wireless device having signal processing apparatus, the signal processing apparatus being operable to predict the power of a wireless signal received by the wireless device, the signal processing apparatus being arranged to:
    sample the power of the received wireless signal over an observation interval to obtain a first series of values representative of the power of the received wireless signal over the observation interval;
    perform a smoothing operation on the first series of values to give a series of smoothed samples over the observation interval; and
    extrapolate the smoothed samples beyond the observation interval to predict the future power of the received wireless signal.

14. Signal processing apparatus arranged to perform a method of predicting the power of a received wireless signal, the method comprising the steps of:
    sampling the power of the received wireless signal over an observation interval to obtain a first series of values representative of the power of the received wireless signal over the observation interval;
    performing a smoothing operation on the first series of values to give a series of smoothed samples over the observation interval; and
    extrapolating the smoothed samples beyond the observation interval to predict the future power of the received wireless signal.

15. A computer program executable to cause signal processing apparatus to perform a method of predicting the power of a received wireless signal, the method comprising the steps of:
    sampling the power of the received wireless signal over an observation interval to obtain a first series of values representative of the power of the received wireless signal over the observation interval;
    performing a smoothing operation on the first series of values to give a series of smoothed samples over the observation interval; and extrapolating the smoothed samples beyond the observation interval to predict the future power of the received wireless signal.

16. A computer program stored on a data carrier, the computer program being executable to cause signal processing apparatus to perform a method of predicting the power of a received wireless signal, the method comprising the steps of:

sampling the power of the received wireless signal over an observation interval to obtain a first series of values representative of the power of the received wireless signal over the observation interval;

performing a smoothing operation on the first series of values to give a series of smoothed samples over the observation interval; and extrapolating the smoothed samples beyond the observation interval to predict the future power of the received wireless signal.

17. A computer program executing on signal processing apparatus, the program causing the signal processing apparatus to perform a method of predicting the power of a received wireless signal, the method comprising the steps of:

sampling the power of the received wireless signal over an observation Interval to obtain a first series of values representative of the power of the received wireless signal over the observation interval;

performing a smoothing operation on the first series of values to give a series of smoothed samples over the observation interval; and extrapolating the smoothed samples beyond the observation interval to predict the future power of the received wireless signal.

\* \* \* \* \*